United States Patent

[11] 3,590,558

[72] Inventor John H. Fernandes
 Windsor, Conn.
[21] Appl. No. 778,917
[22] Filed Nov. 15, 1968
[45] Patented July 6, 1971
[73] Assignee Combustion Engineering, Inc.
 Windsor, Conn.
 Continuation of application Ser. No.
 514,582, Dec. 17, 1965, now abandoned.

[54] PARTICLE-FROM-FLUID SEPARATOR
 8 Claims, 7 Drawing Figs.
[52] U.S. Cl. ............................................. 55/338,
 55/416, 55/449, 55/457, 55/460
[51] Int. Cl. ...................................... B01d 45/12,
 B04c 5/06
[50] Field of Search ....................................... 55/449,
 416, 338, 340, 457, 460

[56] References Cited
 UNITED STATES PATENTS

| | | | |
|---|---|---|---|
| 933,566 | 9/1909 | Kennedy | 55/449 |
| 1,066,704 | 7/1913 | Brassert | 55/391 |
| 2,106,589 | 1/1938 | Bigger et al. | 55/205 |
| 2,378,632 | 6/1945 | Hooker, Jr. et al. | 210/512 |
| 2,582,423 | 1/1952 | Foley | 55/426 |
| 2,667,944 | 2/1954 | Crites | 55/449 |
| 2,936,043 | 5/1960 | Armstrong et al. | 55/416 |
| 3,212,240 | 10/1965 | Streete | 55/346 |
| 3,243,941 | 4/1966 | Peterson | 55/345 |
| 3,288,300 | 11/1966 | Bouchillon | 55/459 |
| 1,703,917 | 3/1929 | Alexander | 55/450 |
| 2,981,369 | 4/1961 | Yellott et al. | 55/449 |
| 3,370,407 | 2/1968 | Morawski | 55/449 |
| 1,906,432 | 5/1933 | Summers | 55/457 |
| 2,655,263 | 10/1953 | Chisholm | 209/211 |
| 2,918,139 | 12/1959 | Silverman | 55/339 |
| 3,199,272 | 8/1965 | Oehlrich et al. | 55/261 |

FOREIGN PATENTS

| | | | |
|---|---|---|---|
| 1,107,367 | 5/1961 | Germany | 55/413 |
| 676,558 | 6/1952 | Great Britain | 55/391 |
| 700,791 | 12/1953 | Great Britain | 55/426 |
| 910,165 | 11/1962 | Great Britain | 55/416 |
| 641,422 | 5/1962 | Canada | 55/346 |
| 149,724 | 4/1963 | U.S.S.R. | 55/459 |

Primary Examiner—Frank W. Lutter
Assistant Examiner—Bernard Nozick
Attorneys—Carlton F. Bryant, Eldon H. Luther, Robert L. Olson, John F. Carney, Richard H. Berneike, Edward L. Kochey, Jr. and Lawrence P. Kessler

ABSTRACT: A cyclone separator having flow diverging apparatus adjacent the inlet end of the discharge tube for skimming off the outer layer of fluid flowing along the core vortex flow path and for diverting this fluid into the peripheral vortex flow path prior to its entrance into the discharge tube whereby the diverted fluid will be recirculated through the separator. By means of this diversion of fluid away from the discharge tube inlet, particulate fines contained in the core vortex flow path are prevented from exiting the separator chamber with the processed gas. These fines are instead recirculated through the separation chamber for further processing thereby to increase the particle separation efficiencies of the apparatus.

PATENTED JUL 6 1971 3,590,558

INVENTOR.
JOHN H. FERNANDES

BY John F. Carney

ATTORNEY

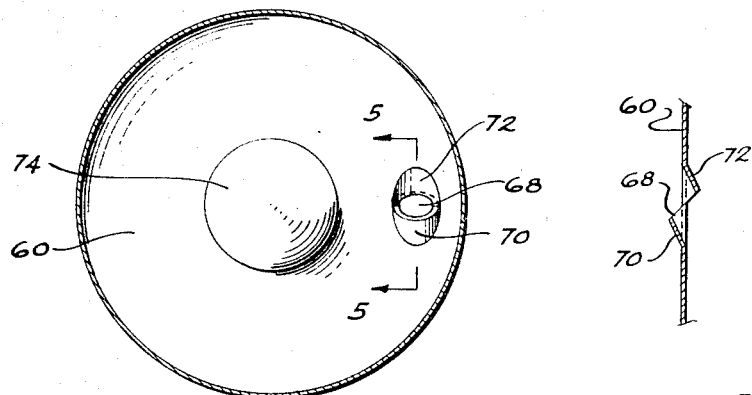
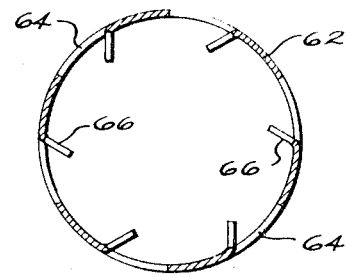
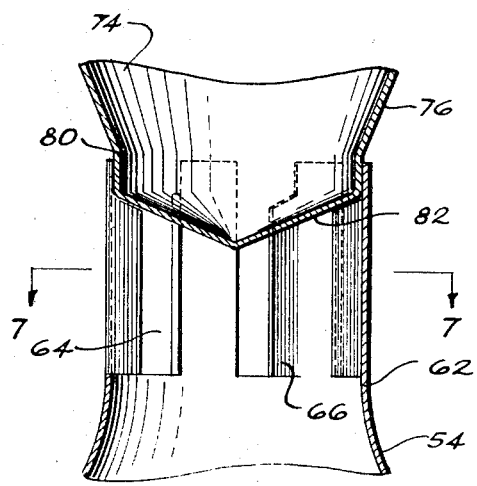
FIG-4
FIG-5
FIG-7
FIG-6
INVENTOR.
JOHN H. FERNANDES
BY John F. Carney
ATTORNEY

PARTICLE-FROM-FLUID SEPARATOR

This application is a continuation of U.S. Pat. application Ser. No. 514,582 filed Dec. 17, 1965 now abandoned.

BACKGROUND OF THE INVENTION

Many industrial fluids, such as the gases resulting from the complete or partial combustion of fuels in boilers, metallurgical furnaces, and the like, or gases and fumes emitted by chemical processes, among others, contain particles which are desirably removed either for the economic value of the particles or in order to purify the fluid. Several types of particle separating apparatus have been heretofore proposed to solve the problem of removing particles from fluid suspension but have been unsatisfactory for various reasons including, for instance, high cost, low efficiency or high space requirements.

The present invention relates to a class of particle-from-gas separators known as cyclone separators. In such separators a gas laden with dust particles is introduced through an inlet into a separation chamber, the inlet being tangentially oriented with respect to the chamber interior or else incorporating helical vanes whereby the fluid entering the chamber is imparted with a high velocity spin. Due to the centrifugal forces generated in the spinning fluid the dust particles entrained therein are flung to the wall of the chamber from whence they pass downwardly to the bottom of the chamber to be discharged therefrom. Adjacent the bottom of the chamber the processed gas normally reverses its axial direction of flow, either naturally due to a loss of momentum or as a result of being directed by a conical surface provided in the lower portion of the chamber wall, and flows upwardly through the central region of the chamber interior to be passed therefrom through a discharge tube that is concentrically arranged with respect to the upper end of the chamber wall.

Particle separators of the instant type exhibit satisfactory particle separation efficiencies when operating on gas laden with dust particles of substantial size, such as 10 microns or greater, but their separation efficiencies decrease markedly when they are employed to process gases having entrained particles that are less than 10 microns in size. For this reason it has heretofore been necessary to employ expensive electrostatic precipitators for processing gases containing particles finer than the above-mentioned particle size in order to obtain adequate particle removal.

The present invention, therefore, is directed toward the provision of an improved form of mechanical or cyclone separator apparatus capable of delivering higher particle separation efficiencies over a greater range of particle sizes than those of similar apparatus heretofore known in the art.

SUMMARY OF THE INVENTION

The present invention, which operates on the same basic principle as conventional cyclone separators, evolved from the recognition of the fact that in conventional apparatus particle separation is terminated once the fluid is passed from its radially outer vortical flow path, hereafter referred to as the peripheral vortex flow path, and directed into the oppositely directed core vortex flow path to be passed to the discharge tube. This, of course, results in the passage of any particulate fines still entrained in the processed gas out of the discharge tube thereby reducing the purity of the processed gas and hence the separation efficiency of the apparatus. In the present invention means in the form of a flow diverter are provided adjacent the inlet end of the discharge tube to positively remove at least the heavier of these particulate fines from the upwardly flowing core vortex flow path prior to their entering the discharge tube thereby to prevent the fines from being conducted from the apparatus. The flow diverter passes these fines together with the fluid in which they are entrained into the peripheral vortex flow path for the purpose of recirculating them through the separation chamber in mixed relation with the fluid making its initial pass therethrough whereby the fines will be again acted upon by the centrifugal forces generated in the peripheral vortex flow path and separated from the fluid. Through the use of the flow diverter, therefore, the processed gas delivered by the separator apparatus is cleaner than that obtained from similar apparatus not incorporating the invention.

Stated broadly, therefore, the invention involves the provision of apparatus in a cyclone separator which is operative, in a relatively turbulence-free manner, to intercept a portion of upwardly flowing fluid in the core vortex flow path that contains the particulate fines not removed in the first pass of fluid through the separation chamber and effective to radially divert the intercepted fluid into the peripheral vortex flow path where it mixes with the mixture entering the chamber. As a result the fines contained in the diverted fluid are given an opportunity to agglomerate with themselves and/or with the particles entrained in the entering fluid such that their separation can be more easily effected by centrifugal action.

In order to augment the effectiveness of the flow diverter, additional means, in the form of a flow reversing head are disposed in the separation chamber and are effective to positively direct the fluid from the peripheral vortex flow path into the core vortex flow path in such a way that the fluid flowing in the latter retains a relatively high rotational velocity. Because of this fluid rotation the particulate fines contained in the core vortex flow path are caused to migrate to the radially outer layers of the core vortex flow under the influence of centrifugal force whereby they can be intercepted by the flow diverting means adjacent the inlet of the discharge tube and recirculated through the separation chamber.

The invention further incorporates a streamlined, drop-shaped body that operates in conjunction with the flow reversing head to stabilize the location of the core vortex flow path with respect to the axis of the separator tube so as to fix the location of the core vortex flow path with respect to the skimming edge of the flow diverting means such that the outer layers of the flow path can be effectively skimmed therefrom and diverted away from the discharge tube inlet. Moreover, this drop-shaped body is provided with a major diameter that is effective to size the core vortex flow path such that its diameter adjacent the flow diverting means will be sufficiently large such that interception of the outer layers thereof can be effected by the flow diverting means.

In the disclosed form of the invention, the apparatus is provided with a secondary separation chamber in which a second stage of particle separation can be accomplished. In the secondary separation chamber the particles discharged from the primary separation chamber together with the minor portion of gas that conducts the fines are separated by centrifugal action with the particles being discharged from the bottom of the chamber to a collection hopper or the like, and the gas undergoing a reversal of direction and being readmitted to the primary separation chamber through openings provided in the reversing head. These openings are so disposed as to permit the readmitted gas to mix with the gas flowing in the primary separation chamber in a manner that is not disruptive of the fluid flow patterns therein.

It is, therefore, a principal object of the present invention to provide an improved form of cyclone separator that is effective to achieve higher particle separation efficiencies than can be achieved by centrifugal separators heretofore known in the art. Another object of the invention is to provide a cyclone separator capable of achieving high particle separation efficiencies when operating on gases laden with particles of sizes in the lower micron ranges.

Various other objects and advantages will appear from the following description of one embodiment of the invention, and the novel features will be particularly pointed out hereinafter in connection with the appended claims.

DESCRIPTION OF THE DRAWINGS

FIG. 4 is a horizontal sectional view taken along line 4-4 of FIG. 1;

FIG. 5 is a sectional view taken along line 5-5 of FIG. 4;

FIG. 6 is an enlarged detail of the connection between the drop-shaped bulb and the reversing head in the disclosed apparatus; and FIG. 7 is a section taken along line 7-7 of FIG. 6.

DESCRIPTION OF THE PREFERRED EMBODIMENT

Figure 1:
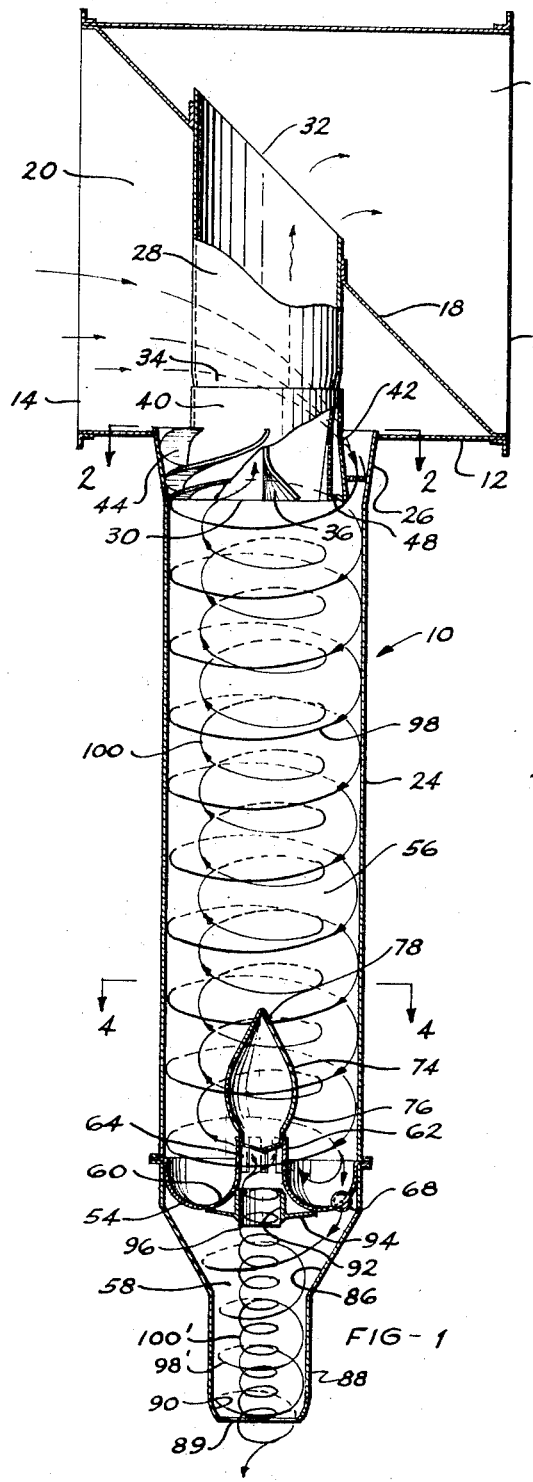
FIG. 1 is a vertical sectional elevation of a particle-from-fluid separator apparatus embodying the present invention.
Figure 2:
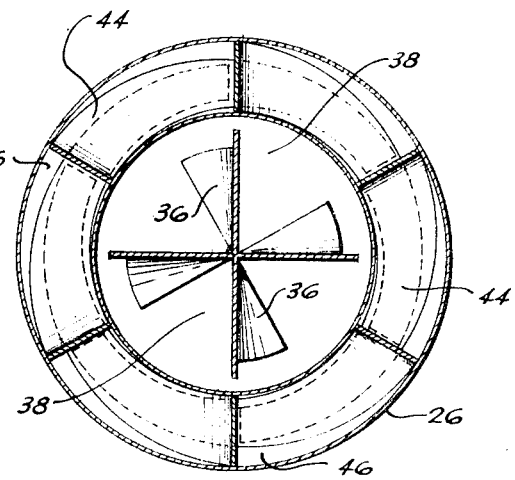
FIG. 2 is a horizontal sectional view taken along line 2-2 of FIG. 1.

Referring now to FIG. 1 of the drawings, there is shown a centrifugal separator apparatus 10 commonly referred to as a cyclone separator constructed in accordance with the present invention. The apparatus 10 incorporates plate means forming a hood 12 from which the body of the separator depends. The hood 12 is provided with an inlet opening 14 for the reception of dirty, particle-laden gases and an outlet opening 16 for discharging clean, processed gases from the apparatus. The interior of the hood 12 contains a diagonally extending plate 18 that divides the same into inlet and outlet plenum chambers, 20 and 22, that communicate with the inlet and outlet openings respectively.

The separator 10 comprises a body in the form of an axially elongated, generally cylindrical separator tube 24 having an upwardly flared, substantially frustoconical upper end 26 that opens to the interior of the inlet plenum chamber 20 of hood 12. An elongated, generally cylindrical discharge tube 28 of lesser diameter than the separator tube 24 extends coaxially into the upper end of the tube in concentrically spaced relation with the inner surface thereof. The discharge tube 28 is an open-ended cylinder having its lower, inlet end 30 arranged in open communication with the interior of the separator tube 24 and its upper, outlet end 32 penetrating the diagonal plate 18 of hood 12 for communication with the outlet plenum chamber 22. As shown, the discharge tube 28 may be provided with a generally frustoconical diffusing interior wall portion 34 adjacent its inlet end for converting the velocity energy contained in the processed gases leaving the separator tube into pressure energy. There may also be provided flow straightening vanes 36 positioned in the discharge tube 28 adjacent to the inlet end 30 for the purpose of transforming the flow pattern of the gases entering the tube from rotational to linear flow. The vanes 36 are generally helically formed at their lower or leading ends and are provided with a gradual transition to a planar shape at their upper ends thereby forming passages 38 within which the flowing gases are caused to recover the pressure potential existing therein.

Figure 3:
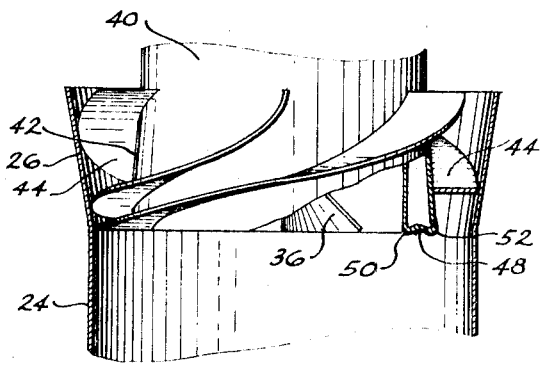
FIG. 3 is a horizontal sectional view taken along line 3-3 of FIG. 1.

As shown in FIG. 1, the inlet end 30 of the gas discharge tube 28 is located a spaced distance below the upper end of the separator tube 24. Because of the difference in diameter between the separator tube 24 and the gas discharge tube 28, there is formed between the opposing surface of each an inlet annulus establishing fluid communication between the interior of the separator tube 24 and the inlet plenum 20. The discharge tube 28 has attached to its outer surface a frustoconical sleeve 40 having an outer surface 42 that is substantially coextensive with the frustoconical upper end portion 26 of the separator tube 24 and cooperates therewith to provide the inlet annulus with a gradually decreasing cross-sectional area that serves to constrict and thereby increase the velocity of the flow of gases through the annulus. Positioned within the annulus are a plurality of circumferentially spaced, generally helically formed vanes 44 forming inlet flow passages 46 that operate to impart rotational flow to the gases entering the separator tube interior. As shown in FIGS. 1 and 3, adjacent vanes 44 overlap one another and are provided with gradually constricting spacing between the upper and lower ends thereof such that they cooperate with the sides of the passages 46 to impart a nozzlelike configuration to the passages. The lower ends of the vanes 44 are disposed at a level that is substantially coplanar with respect to the lower end of the discharge tube 28 and the discharge ends of the passages 46 are substantially tangentially disposed with respect to the inner surface of the separator tube 24, thus to establish a vortical flow path adjacent the separator tube wall for the gases entering the separation chamber. This radially outer vortical flow path is hereinafter referred to as the peripheral vortex flow path 98. For best results, the discharge ends of the passages should possess a relatively small angle of attack with respect to the horizontal. In this manner the fluid being operated on is given a relatively longer residence time within the separation chamber for a given axial length thereof.

According to one aspect of the invention, there is provided between the inlet or leading end 30 of the discharge tube 28 and the lower, or discharge, end of the vanes 44 flow diverting means that are operative to intercept a portion, specifically the radially outer layers, of the fluid flowing along the core vortex flow path and to divert this intercepted fluid into the peripheral vortex flow path for the purpose of preventing the particulate fines flowing along the former from entering the discharge tube and further, to cause them to be recirculated through the separation chamber for further processing. The flow diverting means comprises an annular surface 48 that is concave in lateral section formed on the bottom of the sleeve 40 in facing relation to the direction of flow of the core vortex flow path indicated by the numeral 100. The surface 48 is provided along its radially inner periphery with an annular skimming edge 50 that is formed of a diameter less than that of the core vortex flow path 100 so as to render the edge operative to intercept a selected portion of the fluid flowing along the flow path and, in conjunction with the surface 48, to divert the intercepted fluid radially outwardly away from the discharge tube inlet and into the peripheral vortex flow path 98.

Because the transfer of fluid from the core vortex flow path 100 to the peripheral vortex flow path 98 must be accomplished in a manner that is free from the establishment of turbulent eddies which would be disruptive of the fluid flow within the separator, the surface 48 must be formed as a streamlined surface that permits an unbroken flow of the intercepted fluid radially outwardly from the skimming edge 50. Further, in keeping with this requirement, that portion of the surface 48 adjacent the outer surface edge 52 is inclined downwardly in the direction of flow of the fluid entering the separation chamber from passages 46 so as to direct the diverted fluid into the peripheral vortex flow path 98 without disrupting the flow of fluid entering the chamber. For best results, it has been determined that the flow diverting surface should be formed on the arc of a circle with the inner and outer edges, 50 and 52, respectively, disposed in substantially coplanar relation.

The transfer of fluid between the core and peripheral vortex flow paths is facilitated by the extension of the vanes 44 such that their discharge ends are in substantial coplanar relation with the edge 52 of the flow diverting means. By so extending the vanes 44 the fluid flowing through the passages 46 and discharging into the separation chamber achieves its highest velocity immediately adjacent edge 52. The high velocity fluid flowing past the edge 52 creates a zone of low fluid pressure in this region such that the intercepted fluid traversing the surface 48 will be aspirated into the path of the unprocessed fluid entering the separation chamber through the passages 46.

The feature of extending the vanes 44 to a plane coincident with that containing the edges 50 and 52 of the flow diverting means, in addition to the aforementioned function, also serves to enhance the smooth transfer of diverted fluid from the core vortex flow path 100 to the peripheral vortex flow path 98 by eliminating the establishment of a region of relatively high turbulence adjacent the edge 52 through which the diverted fluid would have to pass in flowing to the peripheral vortex flow path. Because the vanes 44 extend to the edge 52 the fluid flowing through the passages 46 is physically guided to its point of discharge into the interior of the separator tube 24.

Since this point of discharge is disposed immediately adjacent the edge 52 there is no free surface presented by the discharge tube 28 or the sleeve 40 by means of which drag forces could be established to operate on the flowing fluid thereby to effect the occurrence of a region of disruptive turbulence immediately subjacent the edge. By eliminating the means by which these drag forces would be established the present arrangement provides for a transfer of diverted fluid in a controlled, nondisruptive manner.

Provision of the above-described flow diverting means defined by the surface 48 and edges 50 and 52 in cyclone separators of the type disclosed is effective to increase the particle separation efficiency of such apparatus for the reason that particulate fines that heretofore had been conducted with the processed gas up to and through the discharge tube of prior art apparatus are, by means of the flow diverter, prevented from entering the discharge tube. These fines are instead transferred from the core vortex flow path 100 to the peripheral vortex flow path 98 to be recirculated through the interior of the separator tube 24 for further processing. Removal of at least the principal portion of these particulate fines is effected by the presence of the flow diverting means due to the fact that the fines entrained in fluid flowing along the core vortex flow path 98 toward the inlet 30 of the discharge tube 28 are located in the radially outer layers thereof, having been caused to migrate to these outer layers under the influence of centrifugal force generated by the rotation of the core vortex fluid. Being so located in the fluid flow path the particulate fines, upon reaching the proximity of the flow diverting means, are in a position to be intercepted by the skimming edge 50 and diverted away from the discharge tube inlet 30.

According to another aspect of the invention, operation of the novel separator apparatus 10 is enhanced by the provision therein of means to insure that the fluid flowing along the core vortex flow path 100 retains its rotational motion. By retaining the rotational velocity of the fluid flowing along the core vortex flow path 100 particulate fine migration to the outer layers of the flow path is induced thereby rendering the flow diverting means more effective in preventing these particulate fines from entering the discharge tube 28 and contaminating the processed gas flowing therethrough. Such means takes the form of a flow reversing head 54 positioned within the separator tube 24 intermediate the upper and lower ends thereof. The reversing head 54 is located at a preselected spaced axial distance from the discharge ends of the passages 46 such that the fluid flowing along the peripheral vortex flow path 98 will not have expended an appreciable amount of its rotational velocity before being acted upon by the reversing head to smoothly direct the spinning fluid inwardly and upwardly. By positively transferring the spinning fluid from the peripheral vortex flow path 98 to the core vortex flow path 100 in this manner, the rotational velocity of the fluid flowing upwardly along the core vortex flow path is substantially preserved and particulate fine migration to the outer layers of the flow path is enhanced.

In the disclosed embodiment of the invention the reversing head 54, which divides the interior of the separator tube 24 into an upper primary separation chamber 56 and a lower secondary separation chamber 58, comprises a member formed with a generally semitoroidal shape, thereby presenting an annular, concave streamlined surface 60 on its upper side having its radially outer peripheral edge in substantial tangential relation to the inner surface of the separator tube 24 adjacent the lower end of the primary separation chamber 56. The inner periphery of the surface 60 is provided with a generally hollow cylindrical, upstanding extension 62 that is axially disposed within the chamber 56 and whose external surface is tangentially related to the reversing head surface. The surface 60 is interrupted by an opening 68 that may be formed by the provision of oppositely extending depressions 70 and 72 in the reversing head 54 to render the opening scoop-shaped and effective to intercept and discharge particle-laden gas, which at this point in the primary separation chamber 56 contains the bulk of the particulate matter separated from the gas due to its flowing along the peripheral vortex flow path 98 in the primary separation chamber. The fluid passed through the openings 68 is discharged into the secondary separation chamber 58 in tangential relation to the wall thereof such that the fluid retains some degree of rotational flow as it enters the secondary separation chamber 58 for reasons more fully described hereinafter. For best results it has been determined that the particle removal opening 68 should be disposed on the surface 60 at a point slightly radially outwardly from the line of lowest depression on the surface, which would be the line along which erosion of the surface due to impingement of particulate matter would be most apt to occur. By so disposing the opening 68 the surface 60 is therefore rendered less subject to the deleterious effects of erosion.

In order to effect the return passage of fluid from the secondary separation chamber 58 back into the primary separation chamber 56 as hereinafter explained the extension member 62 is formed with a plurality of circumferentially spaced, vertically elongated openings 64 that place the secondary separation chamber in fluid communication with the primary separation chamber. The openings 64 are each provided with a flow directing baffle 66, here shown as extending radially inwardly from one side edge of the opening, so as to induce tangential entry of the gases being returned to the primary separation chamber 56. By so directing the returning fluid the disruptive effect it has on the main flow of fluid traversing the reversing head surface 60 in the primary separation chamber 56 is minimized. Instead, because the returning fluid is induced to spin by the baffles 66 in the same direction as the direction of rotation of the spinning body of fluid in this area of the primary separation chamber 56, it can be smoothly mixed with this main body of fluid without the development of an appreciable amount of turbulence.

Further enhancing the operation of the herein-disclosed embodiment of the present invention is the provision in close, superposed relation to the cylindrical extension member 62 of a flow directing baffle member 74 formed as a surface of revolution having the configuration of a drop-shaped bulb. As shown, the bulb 74 is formed with a streamlined surface having an arcuate or generally spherical lower end 76 and a conical upper end 78 whose apex is upstanding and disposed substantially on the axis of the interior of the separator tube 24. In the disclosed arrangement, the bulb 74 is attached to the upper end of the cylindrical extension 62 by means of a cylindrical boss or projection 80 that extends from the bottom of the bulb and which is adapted for insertion into the end of the extension member. The boss 80 can be connected to the upper end of the extension 62 by welding or other suitable means. As shown in FIG. 6, the bottom surface 82 of the boss 80 is preferably conically formed so as to define a baffling surface for directing the fluid flowing upwardly within the interior of the extension member 62 through the openings 64 therein.

The bulb 74 is positioned within the separator tube 24 to perform a plurality of functions. First, the bulb, being disposed on the axis of the separator tube interior, serves to prevent the flow of fluid emerging from the surface 60 of the reversing head 54 into the central or axial region of the separation chamber 56. This region, being a zone of low fluid pressure due to the rotational motion of the fluid flowing along the core vortex flow path 100, otherwise presents an avenue of escape along which gases containing the particulate fines sought to be separated could flow upwardly to the inlet 30 of the discharge tube 28 without being acted upon by the flow diverting means thus to reduce the separation efficiency of the apparatus. Because of the presence of the flow directing bulb 74 the fluid that traverses the surface 60 of the reversing head 54 is directed radially outwardly away from the low pressure region and into the core vortex flow path 100. By means of this arrangement, therefore, the danger of this fluid entering the axial, low pressure region of the separator tube 24 is minimized.

Secondly, the aerodynamic shape of the bulb 74 is such as will cause it to stabilize the location of the core vortex flow path along the axis of the separator tube 24 and thereby fix its relative position with respect to the flow diverting means so as to render the skimming edge 50 thereof operative to intercept and divert the selected portion of core vortex fluid away from the discharge tube inlet 30 and into the peripheral vortex flow path 100. And thirdly, the major diameter of the bulb 74 can be dimensioned to size the diameter of the core vortex flow path 100 to insure that the flow path adjacent the discharge tube inlet 30 is of a diameter greater than that of the skimming edge 50 of the flow diverting means so as to render that edge effective to remove the selected portion of core vortex fluid.

For the sake of simplicity of construction, it is contemplated to fabricate the separator tube 24 in two sections, each comprising the wall means that enclose the primary and secondary separation chambers 56 and 58, respectively. These sections may be formed with flanged ends as shown in FIGS. 1 and 4 that accommodate threaded or other forms of fastening connections. In like manner the reversing head 54 can be independently fabricated and provided with a peripheral flange that is adapted to be interposed between the separator tube section flanges and fastened together therewith.

The secondary separation chamber 58 is formed by a depending extension of the separator tube 24. The wall of the chamber 58 is preferably formed with a frustoconical portion 86 providing a convergent surface operable to act upon the fluid flowing into the chamber to gradually increase the centrifugal force generated therein by increasing the tangential velocity of the fluid and decreasing the vortex radius thereof. A cylindrical wall portion 88 depends from and communicates with the lower end of the frustoconical portion 86 and is open to the exterior of the separator tube at its lower end 89 for the purpose of discharging particulate matter removed in the separation process. An annular, curvilinear constriction 90 surrounds the lower end of the cylindrical wall portion 88 and serves to direct the flow of fluid adjacent the wall radially inwardly thereby to initiate the reversal of direction of the flowing gases in a somewhat similar fashion to that of the surface 60 of the reversing head 54 in the primary separation chamber 56. This reversal of direction, in conjunction with the effect of gravity, serves to separate and discharge the agglomerated particulate matter to the collection hopper (not shown).

At the top of the secondary separation chamber 58 there is provided a generally cylindrical conducting tube 92 which is, in effect, an axial extension of the cylindrical extension 62 of the reversing head 54 and whose interior portion communicates with the interior of the extension 62 for conducting returning gases to the openings 64 in the latter. The tube 92 is open at both ends and has its lower end disposed only slightly below the lower surface of the reversing head 54. As shown, the lower end of the tube 92 is provided with a laterally extending annular flange 94 that is formed with its inner periphery converging into the wall of the tube 92 so as to form a skimming edge 96 operative to recirculate a portion of the upwardly flowing gases in the secondary separation chamber 58 in a manner similar, though not as effective as, the skimming edge 50 of the flow diverting surface 48 operative in the primary separation chamber 56.

The operation of the herein disclosed cyclone separating apparatus is as follows: Dust-laden gases from the discharge end of a boiler or the like are caused to flow through the hood inlet 14 into the inlet plenum chamber 20 from whence they are directed by means of the lower surface of the annular plate 18 into the inlet of the separator formed by the tapering, nozzlelike passages 46 defined by the vanes 44 where they are imparted with a high velocity spin and acceleration and are introduced to the interior of the separator tube 24 along the peripheral vortex flow path 98. Ideally, the angle between the discharge ends of the vanes 44 and the horizontal is small, thereby insuring maximum residence time of the fluid in the separation chamber for improved particle separation. The rotary motion imparted to the fluid causes the dust particles entrained therein to be flung outwardly toward the wall of the tube 24 by centrifugal force where they pass downwardly in a spiral ribbon adjacent the wall. Upon reaching the bottom of the primary separation chamber 56 the spiralling gas stream and the ribbon of separated particles encounters the reversing head 54. The reversing head 54 effects a 180° reversal of flow of the gases flowing in the peripheral vortex flow path 98 while maintaining the rotational velocity of the spinning fluid. The gas is forced radially inwardly and upwardly thereby generating the core vortex flow path 100. The fluid flowing along the core vortex flow path 100 spins in the same direction as that flowing along the peripheral vortex flow path 98 but the vertical component of velocity is directed upwardly. The ribbon of particles separated from the fluid during its flow along the peripheral vortex flow path 98 are discharged from the primary separation chamber 56 into the secondary separation chamber 58 through the scoop-shaped opening 68. This particulate discharge through the opening 68 contains a small amount, about 5 percent of flowing gas that serves as a carrier for the particles. This conveying stream discharges the particulate matter into the secondary separation chamber 58 which serves as a settling chamber for the particles. The fluid entering this chamber continues to spin thereby effecting particle separation from the conveying gas by centrifugal action as well as by gravitational forces. The bottom of the chamber 58 is open for the continuous discharge of separated particles into the collection hopper.

The small amount of purged conveying gas in this chamber 58 is returned to the primary separation chamber 56 through the reentry openings 64 provided in the reversing head extension 62. By tangentially introducing the reentering fluid, its spin is reestablished allowing it to smoothly rejoin the main gas flow in the primary separation chamber 56 without the establishment of an appreciable amount of turbulence. As shown, this point of reentry is just below the drop-shaped bulb 74 such that the bulb operates on this reentering fluid as well as on that fluid which is undergoing its transfer from the peripheral vortex flow path 98 to the core vortex flow path 100. The bulb 74 serves to direct these now-combined flows radially outwardly as they begin their upward flow along the core vortex flow path 100 in the central region of the separation chamber. By the time the fluid flowing along the core vortex flow path 100, which now contains only the particulate fines not capable of being separated during the fluid's flow along the peripheral vortex flow path 98, reaches the inlet end of the discharge tube 28 the entrained particle fines have been forced radially outwardly to the outer layers of the core vortex due to the centrifugal force generated by the rotational motion of fluid flowing along this flow path. The skimming edge 50 intercepts the outer dust-laden layers of core vortex fluid and diverts it radially outwardly into the stream of fluid flowing from the passages 46 into the peripheral vortex flow path 98 where it is mixed therewith such that the particle fines contained in the diverted fluid can agglomerate with themselves and/or with the larger particles entrained in the incoming fluid to be again acted upon by the centrifugal force generated in the peripheral vortex flow path to be thus separated from the flowing gas and discharged through the opening 68.

The herein disclosed novel form of cyclone separating apparatus 10 is thus operative to provide increased particle separation efficiencies than are capable of being provided by apparatus heretofore known in the art. The flow diverting means defined by the surface 48 and edges 50 and 52 by being operative to intercept a selected portion of the fluid flowing in the core vortex flow path 100 and divert the intercepted fluid back into the peripheral vortex flow path 98, is thus effective to increase the particle separation efficiency of the device by preventing the major portion of particle fines not discharged through the opening 68 from being passed through the interior of the discharge tube 28 into the outlet plenum 22 of the hood 12 where their effect would be to contaminate the processed gas. Because the processed gases are not so contaminated with particulate fines the purity of the gases is increased.

Moreover, because the instant apparatus provides means in the form of a reversing head 54 that is effective to maintain the rotational motion of the fluid flowing along the core vortex flow path 100 centrifugal forces are generated in the flowing fluid. The presence of these centrifugal forces in the core vortex flow path render the apparatus capable of separating particle fines of much less density than were heretofore thought to be capable of separation by a centrifugal separator. By positively spinning the fluid along the core vortex flow path smaller particle fines, i.e. those having a size of less than 10 microns, can be caused to migrate into the outer layers of the core vortex fluid where they will be intercepted by the flow diverting means and thus prevented from exiting through the discharge tube. The apparatus is thereby rendered effective to deliver increased particle separation efficiencies over a greater range of particle sizes.

It will be understood that various changes in the details, materials, and arrangements of parts which have been herein described and illustrated in order to explain the nature of the invention may be made by those skilled in the art within the principle and scope of the invention as expressed in the appended claims.

I claim:

1. A centrifugal separating apparatus for removing particles from suspension in fluids, comprising:
  a. a generally cylindrical separator tube defining a spinning chamber;
  b. an open-ended discharge tube extending coaxially within one end of said separator tube and defining an axial fluid outlet passage communicating with said spinning chamber for discharging processed fluid therefrom, said discharge tube being concentrically spaced from the wall of said separator tube to form an annular fluid inlet passage concentric with said outlet passage, for passing fluid to be processed to said spinning chamber,
  c. means in said fluid inlet passage for spinning the fluid admitted to said spinning chamber for the purpose of causing said fluid to flow on concentric and oppositely axially directed peripheral and core vortex flow paths within said spinning chamber,
  d. means in said separator tube remote from said one end thereof for discharging particles separated from said fluid during its flow along said peripheral vortex flow path,
  e. flow diverting means disposed within said spinning chamber adjacent the leading end of said discharge tube for intercepting the particle fines entrained in the fluid flowing along said core vortex flow path and for diverting the intercepted fluid into the peripheral vortex flow path, said flow diverting means comprising an annular concavity disposed about the leading end of said discharge tube in facing relation to the direction of flow of said core vortex flow path, said concavity being disposed substantially normal to the axis of said separator tube and having a streamlined, arcuate surface across which fluid can flow in an unbroken, relatively turbulence-free stream between said core vortex flow path and said peripheral vortex flow path, said surface terminating at its inner periphery in an annular skimming edge of a diameter less than the major diameter of said core vortex flow path to render it operative to intercept and radially divert the outer layers of fluid and entrained particle fines flowing along said core vortex flow path and at its outer periphery in an annular flow directing surface inclined in the axial direction of said peripheral vortex flow path for directing said diverted fluid and entrained particle fines toward said peripheral vortex flow path,
  f. means in said inlet passage for aspirating the diverted fluid into mixed relation with the fluid flowing along said peripheral vortex flow path, and
  g. means in said separator tube for forming said core vortex flow path to a diameter greater than that of said annular skimming edge and less than the diameter of the outer periphery of said flow diverting means.

2. Apparatus as recited in claim 1 wherein said flow diverting means comprises an annular concavity having a streamlined surface formed on the arc of a circle and terminating in coplanar inner and outer peripheral edges.

3. Apparatus as recited in claim 1 wherein said fluid rotating means comprise:
  a. a plurality of helically arranged vanes disposed in said fluid inlet passage in overlapping, circumferentially spaced relation for imparting a high velocity rotation to the fluid admitted to said spinning chamber;
  b. the discharge ends of said vanes being disposed substantially tangent to the wall of said separator tube and terminating in a plane substantially coincident with that of the outer peripheral edge of said flow diverting means for aspirating the fluid intercepted by said flow diverting means into said peripheral vortex flow path.

4. Apparatus as recited in claim 1 including:
  a. means for positively reversing the axial direction of fluid flow in said spinning chamber from said peripheral vortex flow path to said core vortex flow path while preserving the rotational motion of said spinning fluid for concentrating the particle fines entrained in the fluid flowing along the core vortex flow path in the radially outer layers thereof, said means comprising a reversing head disposed in said separator tube axially spaced from said one end thereof and having an annular concave surface, curvilinear in cross section, in facing relation to the direction of flow of said peripheral vortex flow path, said concave surface having an outer peripheral end disposed in tangential relation to the wall of said separator tube and an inner peripheral end concentrically disposed about the axis of said separator tube and substantially tangent to a surface parallel therewith;
  b. means forming an opening in said reversing head for discharging particles separated from said fluid during its flow along said peripheral vortex flow path from said spinning chamber, and
  c. means for stabilizing the location of said core vortex flow path in coaxial relation with said skimming edge of said flow diverting means, said means comprising an axially elongated, streamlined surface of revolution having an upper conical end and a lower, generally arcuate end, convex in relation to the direction of fluid flow disposed intermediate said reversing head and said flow diverting means in axial alignment therewith.

5. Apparatus as recited in claim 4 wherein said surface of revolution is provided with a major diameter greater than that of the inner peripheral end of said reversing head for radially expanding said core vortex flow path to a diameter greater than that of said skimming edge of said flow diverting means.

6. Apparatus as recited in claim 5 wherein said surface of revolution defines a substantially drop-shaped bulb.

7. Apparatus as recited in claim 6 including:
  a. means forming a secondary separation chamber for receiving particle entrained fluid from said discharge opening axially spaced from said spinning chamber and separated therefrom by said reversing head,
  b. an axially elongated, hollow, cylindrical extension member extending between and interconnecting said bulb and said inner peripheral end of said reversing head, the interior of said extension member being in fluid communication with said secondary separation chamber,
  c. means forming circumferentially spaced openings in said extension member for passing fluid returned to said spinning chamber from said secondary separation chamber into mixed relation with the fluid traversing the concave surface of said reversing head; and
  d. means for discharging separated particles from said secondary separation chamber.

8. Apparatus as recited in claim 7 including means associated with said circumferentially spaced openings in said extension member for directing fluid discharged from said openings tangentially into said core vortex flow path.